Sheet 1, 4 Sheets.
S. P. Ruggles.
Printing Press.
No. 178. Reissued Sept. 17, 1850.
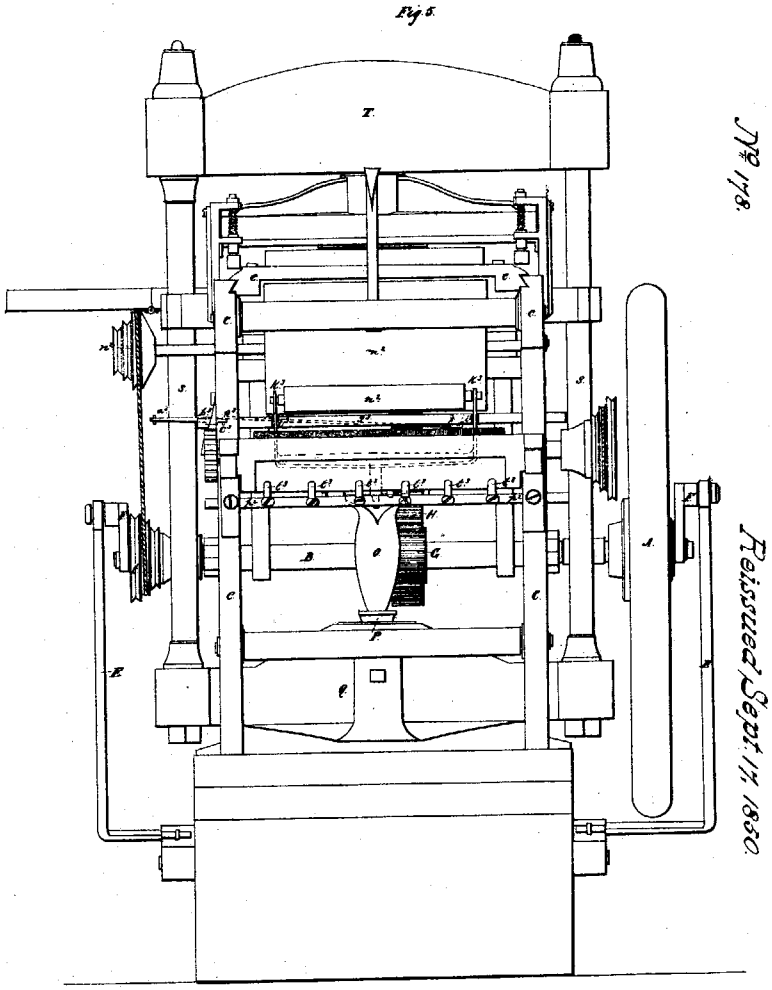
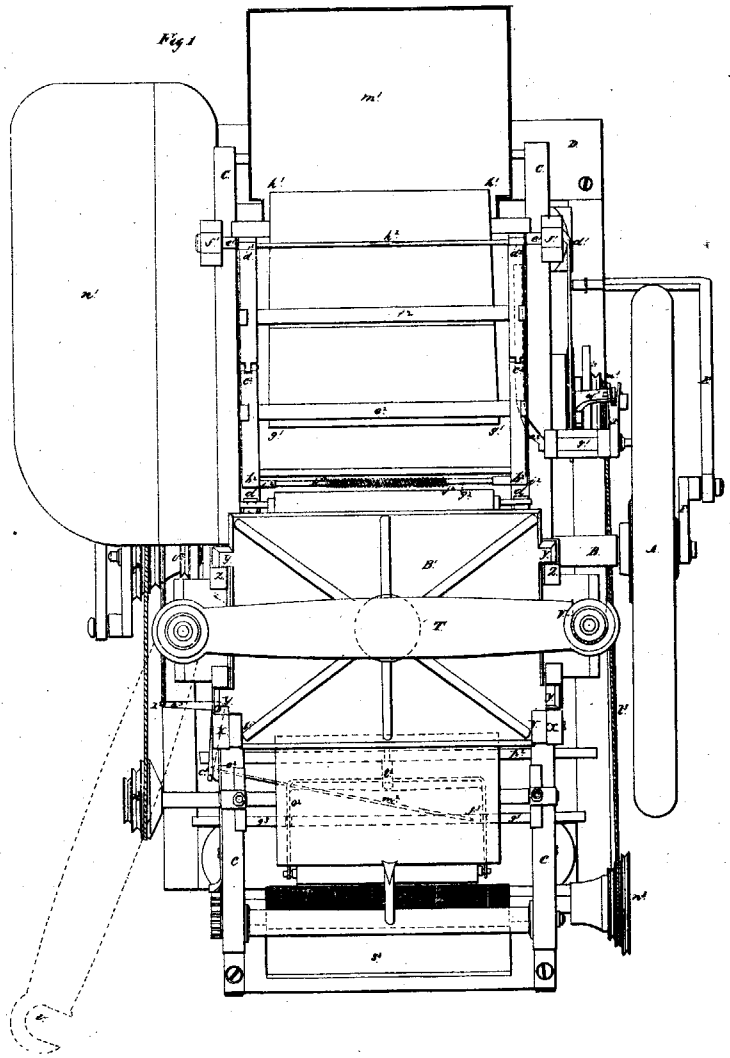
N. PETERS, PHOTO-LITHOGRAPHER, WASHINGTON, D. C.

Sheets, 4 Sheets.
S. P. Ruggles.
Printing Press.
No 178. Reissued Sept. 17, 1850.
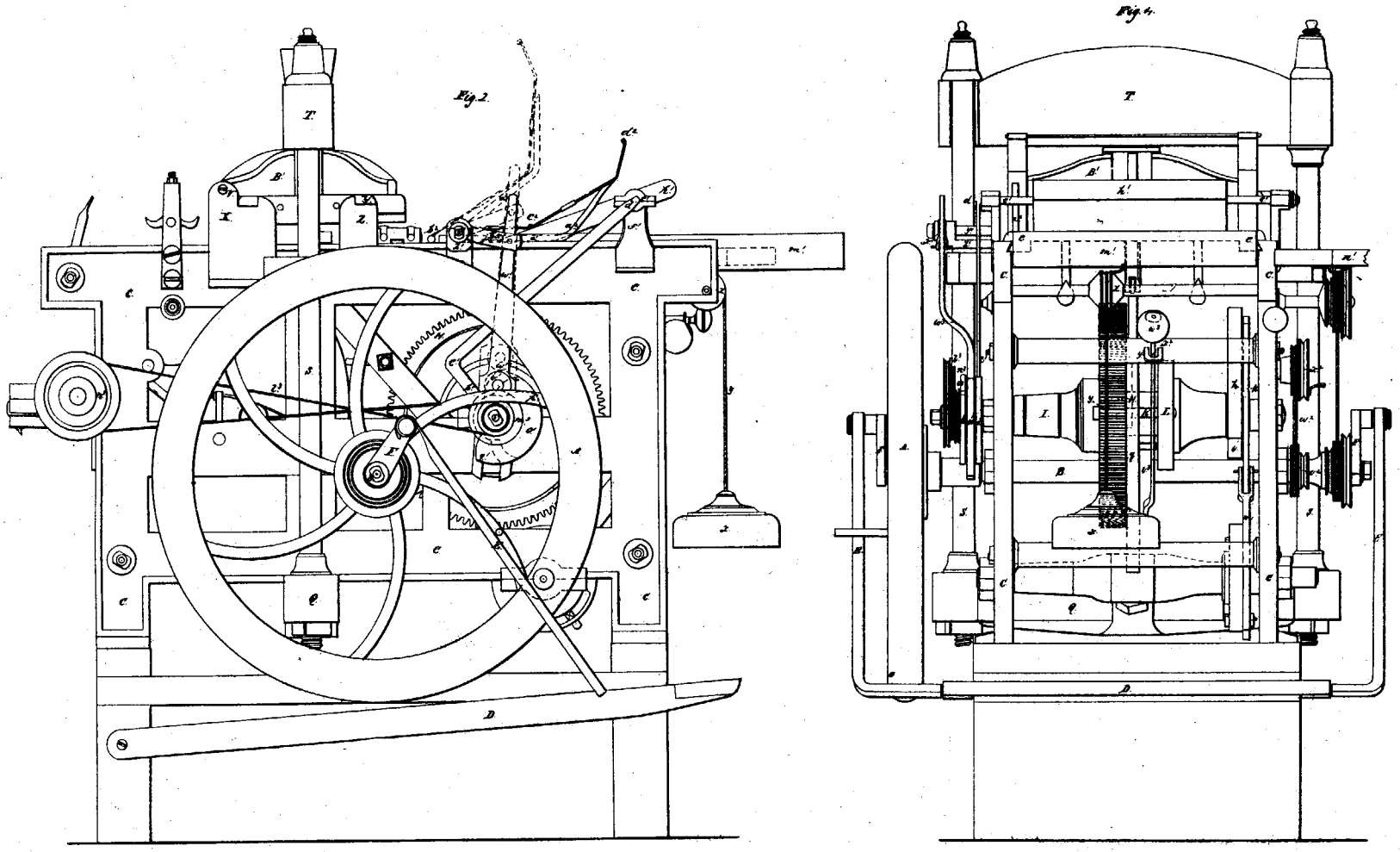
N. PETERS, PHOTO-LITHOGRAPHER, WASHINGTON, D. C.

Sheet 3, 4 Sheets.
S. P. Ruggles.
Printing Press.
No. 178.
Reissued Sept. 17, 1850.
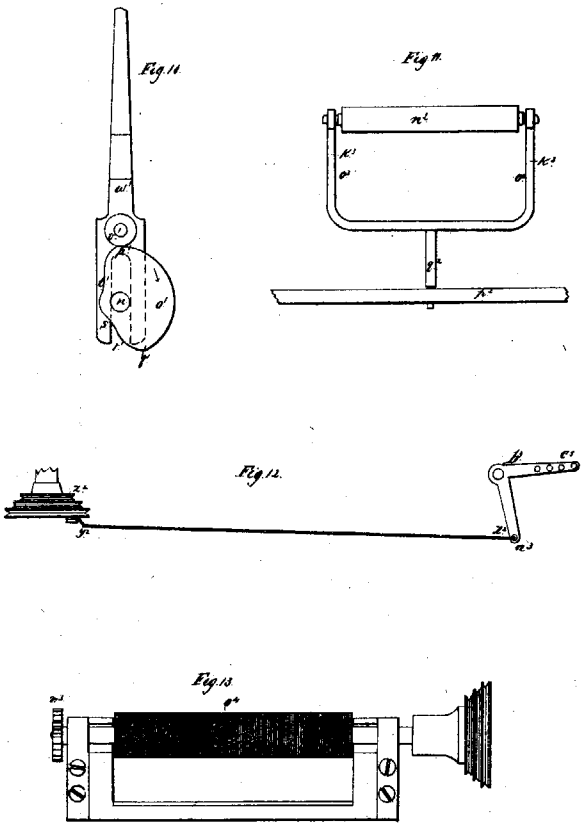
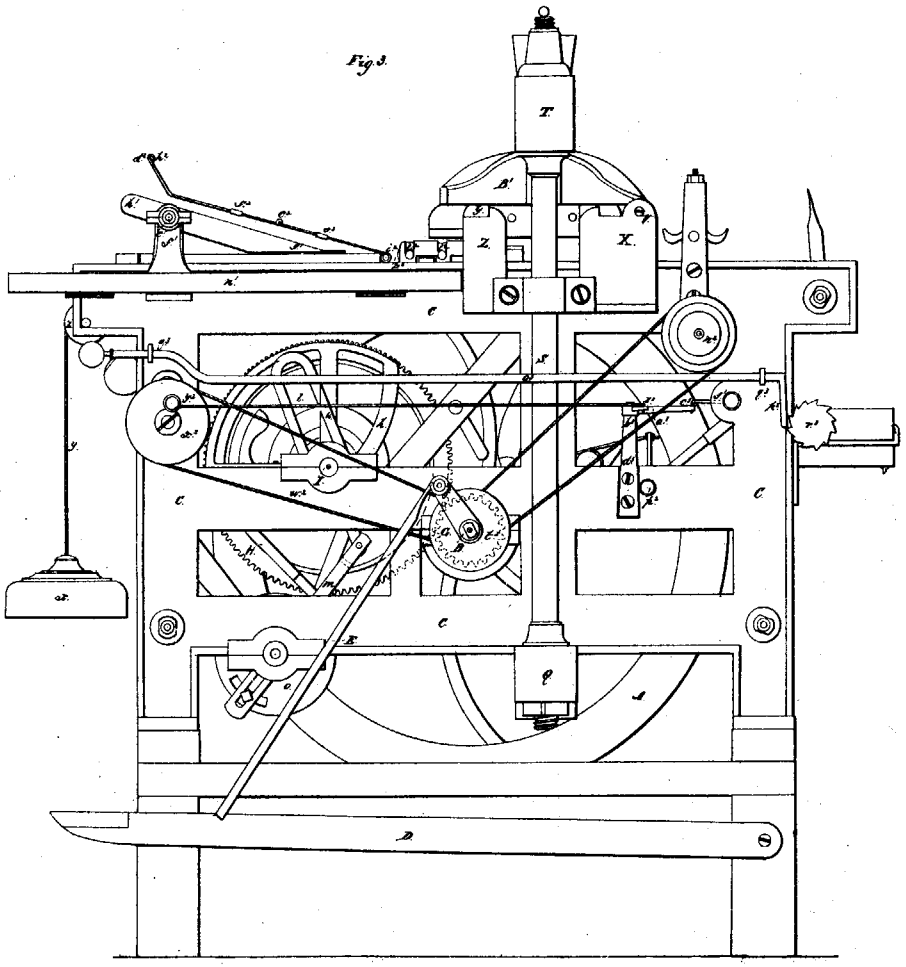
N. PETERS, PHOTO-LITHOGRAPHER, WASHINGTON, D. C.

Sheet 4, 4 Sheets.
S. P. Ruggles.
Printing Press.
No. 178. Reissued Sept. 17, 1850.
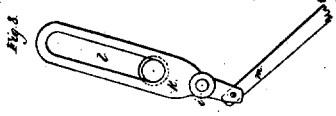
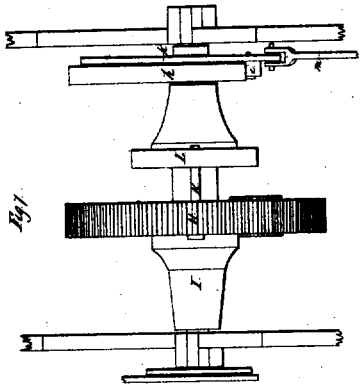
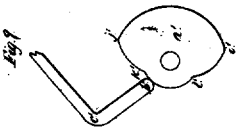
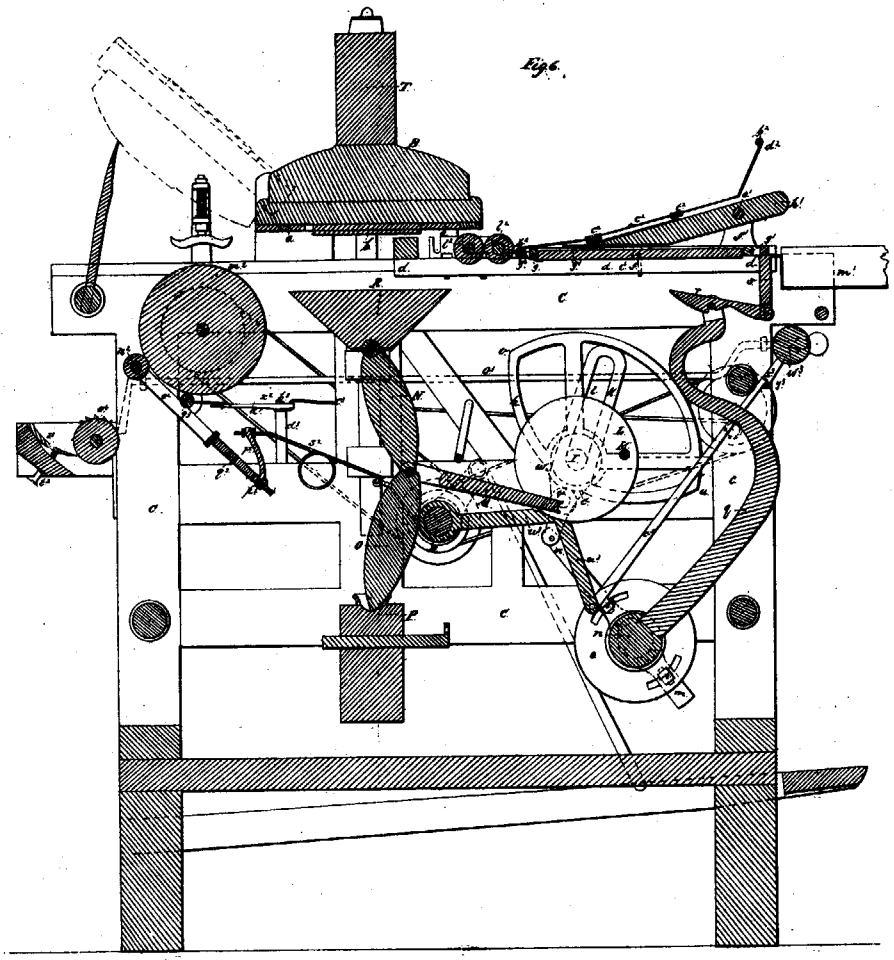
N. PETERS, PHOTO-LITHOGRAPHER, WASHINGTON, D. C.

UNITED STATES PATENT OFFICE.

STEPHEN P. RUGGLES, OF BOSTON, MASSACHUSETTS.

IMPROVEMENT IN PRINTING PRESSES.

Specification forming part of Letters Patent No. 1,851, dated November 10, 1840; Reissue No. 178, dated September 17, 1850.

*To all whom it may concern:*

Be it known that I, STEPHEN P. RUGGLES, have invented new and useful Improvements in Printing-Presses. These improvements, the principles thereof, the application of said principles by which the same may be distinguished from other inventions of a similar character, together with such parts or combinations as I claim to be my invention, I have herein set forth in the following description and accompanying drawings, herein referred to, which, taken in connection, form my specification.

My printing-machine possesses one principal or distinguishing feature which causes it to differ from all others heretofore used, and which consists in inverting the types or arranging them with their letters or faces downward, instead of the usual mode of disposing the same. It has always been supposed that, should types be so arranged, the operation of the press would easily derange them and cause them to fall from the case in which they are usually "locked." But my experience has proved this not to be the case where proper care is previously taken to prepare the form. The types will remain in their places and paper can be printed with as much and greater facility than on a common press, and by thus inverting the types I am enabled to arrange the operative parts of my machine in a more simple manner and to more advantage than I otherwise could.

Figure 1 of the accompanying drawings is a top view of my machine. Figs. 2 and 3 are side views; Figs. 4 and 5, end views; Fig. 6, a vertical longitudinal section; and Figs. 7, 8, 9, &c., represent parts in detail which will be hereinafter described.

A, Figs. 1, 2, 4, and 5, represents the fly-wheel of the press, constructed of the usual form and suitable size, and attached to the driving-shaft B. The journals of this driving-shaft rest and revolve in suitable boxes or bearings connected or attached to each side of the frame-work C C C, the said frame being constructed of cast-iron and properly shaped to support the operative parts of the machine thereto attached. The driving-shaft B and fly-wheel A are revolved in the case of small presses for printing bills by a treadle, D, Fig. 2, (on which the operative presses his foot,) having a rod, E, connecting the same to a crank, F, on each extremity of the shaft B; or, in case of larger presses for heavy work, the shaft B may be turned by manual labor or any other suitable power thereto properly applied. A pinion, G, Figs. 3 and 5, on the shaft B engages with a cogged wheel, H, placed on another shaft, I. A round bolt or pin, K, passes through the wheel H into a circular plate, L, at its side, and (on) shaft I. (See Fig. 7.) When the wheel H is revolved, the pin K meets one end of a pitman, M, Fig. 6, which is hollowed out to receive it, forcing said pitman forward, and at the same time straightening or bringing into a perpendicular line with each other the toggles or progressive levers N O, to which said pitman is joined. The foot of the lower toggle, O, rests in a suitable step in the top of the stationary cross-beam Q, while the upper toggle, N, is connected by a proper joint to the lower side of the platen R, Fig. 6. Two upright pillars, S S, Figs. 2, 3, &c., connect the cross-beam Q to another upper cross-beam, T, being so arranged or having a certain portion of one of its ends cut out, as represented by dotted lines at U, Fig. 1, so as to be easily swung round at any time into the position represented by the dotted lines. The bed B′ is placed immediately under and in contact with the cross-beam T, and is hinged at two corners, V V, Figs. 1, 2, and 3, to the top of standards X, projecting from the frame-work C C, so as to be easily turned up in the position denoted by the dotted lines, Fig. 6, and when brought back again to a horizontal situation it is therein sustained by four ears, Y Y Y, Figs. 1, 2, and 3, projecting from the plate of the bed and resting on the tops of standards Z Z Z Z. The chase *a a*, in which the type *b*, Fig. 6, is locked, is a plain rectangular metallic frame similar to those ordinarily used by printers, and is secured by screws or in any convenient manner to the surface of the bed.

From the above it will be easily seen that the impression is given when the toggles are straightened by the action of the pin K on the end of the pitman, which it forces forward, at the same time raising the end of the pitman during a portion of the revolution of the pin K until the pitman is brought into a horizontal position, when the revolution of the pin still going on, the end of the pitman rises still higher and the pitman and toggles retrograde to their former angular position, when the pin K departs from the pitman and the latter drops downward to its previous position. That portion of the shaft I intervening between the wheel H and the circular plate L has not its axis or center in the same line with the axis on which the shaft revolves, but it is placed a little out of the same, so that its center or axis revolves in a circle in order that when the pitman drops downward it may fall freely to its former position. It first falls on the circular connecting portion of the shaft, and as the shaft revolves still farther it gradually leaves the pitman until it drops therefrom and descends to its lowest position. Directly above the platen is the tympan-plate, which consists of a rectangular plate of metal, *c*, Fig. 6, resting on the bars *d d* of a rectangular carriage, *d d*, Figs. 1 and 6, and *e e*, Figs. 4 and 5, which is suitably supported on rails or ledges secured to the sides of the frame, so as to be pushed forward and drawn backward, for the purpose of carrying the sheet of paper to be printed under the types for their action thereon, and also to withdraw the same after it is printed, and to carry the rollers which lay the ink upon the surface of the type. The tympan-plate *c* is kept in place by two or more small pins projecting downward from each end of the same, and entering loosely into circular holes drilled in the top of each of the side-rails of the carriage *d d*, as shown in Fig. 6, where one of the pins or guides, *f*, represented by dotted lines, is seen projecting from the lower surface of the plate and passing into the rail *d*. When the platen is raised by the toggles, its upper surface comes in contact with the lower surface of the tympan-plate and raises said tympan-plate, with the sheet of paper thereon, to the types, the guides or pins *f* rising at the same time in their respective holes in the rails. When the platen descends, the plate falls also until it meets and rests on the carriage, as before mentioned, and is drawn back or out from between the platen and form to receive another sheet of paper to be printed. The blanket is placed on the upper surface of the tympan-plate *c* in the usual way, and a tympan or a rectangular metallic or wooden frame (represented in section at *g g*, Fig. 6) covered with thin cotton or other suitable cloth surrounds the tympan-plate, the cotton cloth serving to cover the blanket to keep the same in position and to receive the sheet of paper to be printed on its upper surface.

Having thus described the machinery which produces the impression, I now proceed to explain that which operates the tympan-carriage *d d*, before mentioned. A cam, *h*, Figs. 3, 6, and 7, is placed on the shaft I, and under the same is a roller, *i*, attached to the side of a bar or piece of metal, *k*, which has an elongated slot, *l*, through which the shaft I passes, the shape of the piece *k* and its slot *l* being represented in Fig. 8. To the lower end of the piece *k* an arm, *m*, is hinged by a proper joint, the said arm being secured to and projecting from a horizontal shaft, *n*, Fig. 6, by means of a circular plate, *o*, fixed on said shaft, and to which the arm *m* is secured by screws and nuts, the heads of which screws are shown at *p p*, Fig. 6. From the center of the shaft *n* a bent arm, *q*, rises, and is connected with the tympan-carriage by a link, *r*, and a projection, *s*, therefrom. When the revolution of the shaft, to which the cam *h* is attached, causes the portion *t w* thereof to press upon the roller *i*, it depresses said roller, and consequently the arm *k*, at the same time turning the shaft *n* in its bearings and causing the arm *q* to press forward the tympan-carriage, so as to carry the sheet of paper between the platen and form. Then, while the impression is being given by the toggles, the portion *v w* of the cam *h* (which is an arc of a circle whose center is in the axis of the shaft I) is brought in contact with the roller *i*, producing no depression of the same, but causing said roller to preserve a stationary position until the revolution of the shaft *n* brings the portion *v w* in contact with the roller *i*, which permits said roller and the bar *k* to ascend, while the tympan-carriage is drawn back with the printed sheet. The power which draws back the tympan-carriage consists of a weight, *x*, attached to one end of a chain or belt, *y*, passing over a pulley, *z*, the opposite end of said chain or belt, *y*, being affixed to the top of the arm *q*. The portion *t w* of the cam *h* is an arc of a circle whose center is in the axis of the shaft I, and while the same is in contact with the roller *i* it neither raises nor depresses the same, and during the interval of time the operative supplies a new sheet of paper to the tympan-carriage. The machinery which operates the tympan-carriage being described, the next part of the press which comes under our notice is that by which the paper is supplied and removed. A cam, *a'*, Figs. 2, 4, and 9, is placed on the shaft I. A bent rod, *b' c' d'*, having one portion *b' c'* bent at right angles to the other part *c' d'*, and its extremity *b'* resting on the periphery of the cam *a'*, is attached at its end *d'* to the extremity of a horizontal shaft, *e' e'*, Figs. 1 and 2, revolving in suitable bearings in the tops of standards *f' f'*. An inclined table, *g' h'*, Figs. 2 and 6, and *g' h' h' g,'* Fig. 1, is affixed to the shaft *e' e'*, the table having its lowest end, *g'*, made sharp or angular and slightly curved or bent upward, as seen in section, Fig. 6, and suitably covered with tin or a plate of metal. On this table the sheet to be printed is laid, and while the end *b'* of the lever *b' c' d'* is in contact with the point *i'* of the cam the impression is just commencing. Then, while the toggles are acting to raise and lower the platen, the portion *i' j'* of the cam *a'* is revolving in contact with the end *b'* of the lever *b' c' d'*, and as the said portion *i' j'* is the arc of a circle it neither raises nor depresses the end *b'* of the lever, and consequently the table $g'$ $h'$, Fig. 6, remains stationary and the workman lays the sheet thereon. Though he may not commence to lay the sheet on the table until this moment, yet he can perform the same operation at the same moment the sheet is drawn from the table by the frisket; and while the table remains stationary, or the end $b'$ of the lever $b'$ $c'$ $d'$ is in contact with the arc $i'$ $j'$, the impression is given and the tympan-carriage withdrawn from under the platen and form. Then, as the cam $a'$ revolves, the eccentric portion $j'$ $k'$ operates on the end $b'$ of the lever, permitting it to descend and drop the end $g'$, Fig. 6, of the table $g'$ $h'$ upon or toward the surface or top of the tympan, when the machinery which next receives the sheet and confines it to the tympan, (and which will be hereinafter described,) performs its office, and the tympan-carriage carries the sheet between the platen and form. During the period of time it takes the machinery to perform the said operation the circular portion $k'$ $l'$ of the cam $a'$ is in contact with the end $b'$ of the lever, producing no motion of the same. While the cam revolves still farther, or the eccentric part thereof from $l'$ to $i'$ is in contact or rolls against the end $b'$ of the lever, the lever and end $g'$ of the table are raised upward a short distance, so as to enable the tympan-carriage, after the impression is given, to return from between the platen and form with the printed sheet and permit the sheet to pass underneath the table without coming in contact with the same. At the same time the frisket passes over the table, as hereinafter described, so as to remove the sheet of paper on the table at the return of the carriage. At the moment the end $b'$ of the lever $b'$ $c'$ $d'$ passes the point $j'$ of the cam $a'$ in its passage from $j'$ to $k'$, the end $b'$ begins to descend, carrying down at the same time the end $g'$ of the table $g'$ $h'$, Fig. 6, toward the surface of the tympan, so as to cause the under side of the table $g'$ $h'$, at the end of the operation, to bear upon the upper surface of the sheet of paper then on the tympan, and just described as having been printed. The plate of metal which covers the lower side of the table $g'$ $h'$ has its lower surface roughened, or has a number of small wire points projecting therefrom which enter into the paper, and as the tympan-carriage moves in or back between the platen and form with the succeeding sheet to be printed the points above mentioned prevent the printed sheet of paper from being carried between the platen and form, and cause it to drop into the box or receptacle $m'$, attached to the rear of the tympan-carriage. (See Fig. 6.) Thus it will be seen that the sheet, when lying in the box $m'$, exhibits the printed side upward, so as to be immediately under the inspection of the pressman, and if any irregularity in the operation of printing has occurred his eye can easily detect the same. The pile of paper from which the sheets to be printed are taken is laid on a table, $n'$, Figs. 1, 3, 4, attached to the side of the press. The machinery above alluded to, which takes the sheet to be printed and draws it away from the upper surface of the table $g'$ $h'$, Fig. 6, (when the tympan-carriage is moved with the same between the platen and form,) is thus described: A cam, $o'$, (see Figs. 2 and 4,) is placed on the shaft I, and between said cam and the cam $a'$, before described, is a piece of metal or bar, $w'$, whose lower end is forked, so as to straddle the shaft I, as the said bar $w'$ moves up or down, where the fork and shaft are represented, the former by dotted lines. (See Fig. 10.) The object of the fork is to steady the bar $w'$ during its movements. A roller, $v'$, attached to the side of the piece $w'$, rests and moves over the surface or periphery of the cam $o'$. The upper part of the bar $w'$ is connected by a joint to the end of a projection, $x'$, from a short shaft, $y'$, Figs. 1, 2, 4, suitably supported, and running in bearings, on the top of a strut, $z'$, attached to the frame of the press. An angular or bent bar, $a^2$, is attached to the opposite end of the shaft $y'$. A frisket, $b^2$ $c^2$ $d^2$, Figs. 1 and 2, and $b^2$ $c^2$ $b^2$ $c^2$, Fig. 1, (composed of thin bars or strips of metal $b^2$ $c^2$ $b^2$ $c$, connected together at their ends by hinges $c^2$ $c^2$, and transversely by cross strips $e^2$ $f^2$, Fig. 1, and cross-wires, $g^2$ $h^2$,) is attached to the inner side of the tympan $g$ $g$ by hinges $i^2$ $i^2$, so that it can easily be raised to the position denoted by red lines in Fig. 2. A spring, $j^2$ $k^2$, is coiled around the wire $g^2$, having one end, $j^2$, fastened to the wire and the other to the rectangular tympan-frame $g$ $g$. This spring presses the frisket down upon the sheet of paper on the tympan-plate. The lower sides of the cross-strips $e^2$ $f^2$ should be roughened, or have small wire points inserted therein, so as to catch into the sheet of paper when the tympan-carriage starts toward the form with the sheet to be printed, and by the pressure of the spring $j^2$ $k^2$, confine and draw said sheet of paper from the table $g'$ $h'$. When the tympan-carriage returns with the printed sheet, the under surface of the bent top $d^2$ of the frisket meets the upper surface of the angular bar $a^2$ and rises thereon into the position denoted by red lines in Fig. 2, or until the point $p'$ of the cam $o'$ comes in contact with the roll $v'$. Then as the roll $v'$ travels from $p'$ to $t'$, Fig. 10, the bar $w'$, and of course the angular bar $a^2$, will be lowered down so as to drop the cross-bar $e^2$, upon the sheet of paper; and the points on the under side of the same, catching therein, draw the paper from the table $g'$ $h'$ when the tympan-carriage starts forward, and thus the operations of the machinery which carries the paper under the types to be printed and then removes it therefrom after the same is completed are effected. The inking apparatus is thus described: $l^2$ $l^2$, Fig. 6, are two inking-rollers of the ordinary kind attached to the tympan-carriage. When the carriage is drawn back to receive a sheet to be printed, these rollers pass under the face of the type and communicate ink thereto, and when the sheet of paper to be printed is between the platen and form, the inking-rollers rest on the surface of the great distributing-cylinder $m^2$, Fig. 6. A small roller, $n^2$, alternately vibrating from the fountain roller $o^4$ to the distributing-cylinder $m^2$, conveys the ink from the former to the latter. The journals of the roller $n^2$ revolve in bearings in the extremities of a frame, $o^2$, (see Figs. 6 and 11,) which frame is connected to a horizontal cross-shaft, $p^2$, by a projecting rod, $q^2$, Figs. 6 and 11. The shaft $p^2$ has an upright, $r^2$, to the end of which a suitable connecting wire or spring, $s^2$, is attached, proceeding from thence to the upper end of the lower toggle, as seen in Fig. 6. When the toggles fall back to an inclined position with each other, they draw the roll $n^2$ from the fountain-roller up to the surface of the distributing-cylinder $m^2$, and when they are straightened or brought into a line with each other to give an impression, the roller $n^2$ falls back upon the fountain-roller $o^4$. There is a cone or set of variable pulleys, $t^2$, on the end of the driving shaft B, Figs. 1 and 3. From thence a band passes to and around another set of pulleys, $n^2$, on the extremity of the shaft of the distributing-cylinder $m^2$, giving motion to said cylinder. In the rear of the pulleys $t^2$, and fixed on the driving-shaft B, there is another pulley or cone of pulleys, $v^2$, from which a band, $w^2$, passes to and around another set of pulleys, $x^2$, Figs. 3 and 4, affixed to the side of frame, but moving loosely on their center-pin, fastened to and projecting from said frame. One extremity, $y^2$, of a rod, $y^2\ z^2$, is connected to the outside of the pulley $x^2$ by a screw, so as to have a crank-motion at this end. The other extremity, $z^2$, of the rod is joined to one end of a right-angular lever, $a^3\ b^3\ c^3$, moving on a fulcrum, $b^3$, Figs. 1, 3, 6, 12, on the top of a standard, $d^3$, Fig. 3. The arm $b^3\ c^3$ of the bent lever $a^3\ b^3\ c^3$ has a series of holes drilled through it, as represented in Fig. 12, through either of which at pleasure the bent end $e^3$ of a rod, $e^2 f^3$, can be inserted. The other end, $f^3$, of the rod $e^3 f^3$ is joined to the horizontal shaft $g^3$, which shaft slides or vibrates longitudinally back and forth in its bearings, the said vibration being caused by the revolution of the pulley $x^2$ and intervening machinery, consisting of the rod $y^2\ z^2$, the bent lever $a^3 b^3 c^3$, and connecting-rod $e^3\ f^3$, acting upon each other and together. The shaft $g^3$ has notches or spaces $i^3\ i^3$ cut out of the same, which receive the sides $k^3\ k^3$ of the frame $o^2$, Fig. 11, as the same is brought up from the fountain-roller to the distributing-cylinder, and thus, as the shaft $g^3$ has a longitudinal vibration, the same is imparted to the roller $n^2$, which distributes the ink laterally on the surface of the cylinder $m^2$. The shaft $p^2$ is so fitted in its bearings as to be moved longitudinally back and forth in a corresponding manner with and by the shaft $g^3$. A belt, $l^3$, Fig. 2, passing from a cone of pulleys, $m^3$, on the shaft I, to and around another set of pulleys, $n^3$, Figs. 1, 2, 4, on the shaft of the fountain roller, gives motion to said roller, and a long rod, $o^3$, Fig. 3, passing along the side of the frame, capable of being slid back and forth longitudinally in its bearings, $q^3\ q^3$, and having its end $p^3$ bent downward, and on being pushed in contact with a ratchet-wheel, $r^3$, on the other extremity of the shaft of the fountain-roller, stops said roller from revolving whenever necessary. The fountain-roller is constructed somewhat different from those generally used, inasmuch as the whole of its surface is cut into fine parallel or spiral grooves. (See Fig. 13.) The thickness of the stratum of ink upon the same is regulated by the depth of the grooves in the fountain-roller, and the quantity for sheets of different size by the speed of the fountain-roller. A plate, $s^3$, Figs. 1 and 6, serves to prevent the escape of any ink, excepting that which passes into the grooves or indentations of the fountain-roller. This plate is pressed toward the fountain-roller by a series of screws, $t^3\ t^3\ t^3$, Figs. 5 and 6, tapped into the under side of the fountain and operating against the plate $s^3$. Instead of fluting or grooving the fountain roller, as above mentioned, it may have its surface indented by numerous small and regular indentations, or be a plane cylinder, without grooves, and that part of the plate, $s^3$, which is contiguous to the same may be grooved transversely, so that in each case the ink shall be on the cylinder in parallel rings or strips, so that when the surface of the roller $n^2$ comes in contact with the fountain-roller and is pressed against the same the ink will be imparted to the same in short and very thin parallel strips. By this arrangement the ink is laid on the roller $m^2$ and distributed much more perfectly and rapidly than by the common fountain. The end of the pitman M rests when in action on a bent piece of metal, $u^3$, Fig. 6, joined at one end to the driving shaft B, and having a long rod, $v^3$, attached to its other extremity. A knob, $w^3$, enables the pressman to lower the piece of metal $u^3$ that the pitman rests on, and thus depress the pitman so that the pin K shall not act thereon, and thus "throw off the impression" whenever necessary. A notch, $x^3$, in the rod $v^3$, resting on the staple $y^3$, sustains the rod $v^3$ and the pitman, when the latter is raised so as to bring the pin K in contact with the end of the pitman, as the said pin revolves.

Having thus described my machinery, I shall now proceed to enumerate its advantages, and afterward point out such parts as I claim as my invention.

I have contrived my press more particularly for small work, such as bills and cards, those I have made generally being about two feet in width by four feet in length, and are operated by one workman, who by his foot vibrates the treadle and puts the machinery in motion, while with his hands he supplies the press with the sheets of paper or cards to be printed. A press constructed in the above manner of any size will also operate equally well, requiring but one attendant, thus creating a great reduction of labor. From the peculiar arrangements of the machinery the average speed equals twelve hundred impressions each hour, and the convenience of placing and removing a form, or inspecting the same during the time the press is in operation is very great. In comparing this with the common hand-press, it is found that it will print twenty sheets, cards, or labels with one operative in the same time that four are done by two persons, and with a much greater uniformity of color than printing where the types are inked by hand.

In the body of the foregoing specification I have not so pointedly stated the office and useful operation of the thin bars or strips of metal $b^2$ $c^2$ $b^2$ $c^2$, and the cross-strips $e^2$ $f^2$, the former of which is fastened to said bars. These parts, and more particularly the cross-strips $e^2$ $f^2$, are indispensable to the successful operation of my machine, as they hold the sheet closely and firmly to the tympan, which is supported by the platen, until it is entirely drawn or disengaged from the types. This device operates in an entirely different manner from an ordinary frisket, inasmuch as it holds the sheet rigidly to the tympan supported by the platen; and without this or some equivalent mechanical arrangement sheets with smaller margins could not be disengaged from the types either by the ordinary frisket or any other known means. I shall therefore make a specific claim to this device.

I claim—

1. A platen raised and lowered by machinery, substantially as above described, in combination with the movable tympan-plate on which the sheet of paper is placed, and the bed supporting the type with their faces downward, the whole being arranged and operating together substantially in the manner and for the purpose herein explained and set forth.

2. Supplying the press with paper and removing the same after it is printed into a box, $m'$, Fig. 6, attached to the tympan-carriage, by means of a vibrating table, $g'$ $h'$, operated by a cam, $a'$, Fig. 4, on the shaft I, Figs. 4 and 6, in combination with a frisket constructed as above described, connected to the frame $g$ $g$ of the tympan-plate, and pressed down upon said plate by a spring, $j^2$ $k^2$, and raised when the tympan-carriage recedes with the printed sheet by means of a cam, $o'$, Fig. 2, on the shaft I, through the intervention of a bar, $w'$, with a roller, $v'$, shaft $y'$, and angular piece of metal $a^2$, the whole being arranged and operating together substantially as hereinabove explained and set forth.

3. Grooving or channeling the fountain-roller, or plate under the same, in the manner and for the purpose above mentioned.

4. The peculiar combination of machinery for the lateral vibration of the distributing-roller, said combination consisting of the pulleys $v^2$ on the shaft B, band $w^2$, pulleys $x^2$, rod $y^2$ $z^2$, lever $a^3$ $b^3$ $c^3$, rod $e^3$ $f^3$, shaft $g^3$, and distributing roller-frame $o^2$, the whole being arranged and operating together substantially in the manner and for the purpose above-mentioned.

5. The use of the side strips $c^2$ $d^2$ $c^2$ $d^2$, and cross-strips $e^2$ $f^2$, or either of them, in combination with a tympan supported by the platen-plate, the said combination forming a pair of nippers, as it were, for rigidly holding the sheet, however small the margin may be, until it is effectually free or disengaged from the form after an impression is produced.

In testimony that the above is a true description of my said invention and improvements, I have hereto set my signature this 25th day of July, in the year 1850.

STEPHEN P. RUGGLES.

Witnesses:
EZRA LINCOLN,
ROBERT L. HARRIS.